US007222121B2

(12) United States Patent
Casati et al.

(10) Patent No.: US 7,222,121 B2
(45) Date of Patent: May 22, 2007

(54) PLATFORM AND METHOD FOR MONITORING AND ANALYZING DATA

(75) Inventors: Fabio Casati, Palo Alto, CA (US); Ming-Chien Shan, Saratoga, CA (US); Vijay Machiraju, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 547 days.

(21) Appl. No.: 10/302,182

(22) Filed: Nov. 21, 2002

(65) Prior Publication Data

US 2004/0103076 A1 May 27, 2004

(51) Int. Cl.
*G06F 17/30* (2006.01)
*G06F 15/16* (2006.01)

(52) U.S. Cl. ............... 707/100; 707/1; 707/3; 709/224

(58) Field of Classification Search ............. 707/1, 707/3; 709/224; 717/127; 719/318, 330
See application file for complete search history.

(56) References Cited

U.S. PATENT DOCUMENTS 6,021,439 A * 2/2000 Turek et al. ............... 709/224
6,360,235 B1 * 3/2002 Tilt et al. .................. 715/501.1
2002/0049961 A1 * 4/2002 Fang et al. ................ 717/127
2002/0147609 A1 * 10/2002 McGwin, Jr. ................ 705/1
2003/0046383 A1 * 3/2003 Lee et al. .................... 709/224
2003/0105884 A1 * 6/2003 Upton ........................ 709/318
2004/0006653 A1 * 1/2004 Kamen et al. .............. 709/330
2004/0103186 A1 * 5/2004 Casati et al. ................ 709/224
2006/0104202 A1 * 5/2006 Reiner ........................ 370/230

OTHER PUBLICATIONS

UDDI.ORG, Universal Description, Discovery, and Integration, "UDDI Executive White Paper", Accenture, Ariba, Inc., Commerce One, Fujitsu Ltd. Hewlett-Packard Company, i@ Technologies, Intel, IBM, Microsoft, Oracel Corp., SAP AG, Sun Microsystems, and Verisign, 5 pp. (Nov. 14, 2001).
WEB paper/presentation, "Web Services Description Language (WSDL), W3C Note", W3C Members: Ariba, IBM, Microsoft, Web Page Printout—51 pages.(Mar. 15, 2001).

* cited by examiner

*Primary Examiner*—Jeffrey Gaffin
*Assistant Examiner*—Hassan "Tony" Mahmoudi (57) ABSTRACT

A platform and method for monitoring and analyzing data is disclosed and which includes at least one measurement logic which converts service execution data having a plurality of elements into a measure, and wherein a subset of the elements of the service execution data is identified as a context; a metric which identifies an aspect of a business that a user wishes to monitor and analyze, and wherein the metric has a predetermined data type; and a meter which defines the measurement logic used to compute the measures for use with the metric and the subset of the elements within the context.

33 Claims, 2 Drawing Sheets

FIG. 1

PLATFORM AND METHOD FOR MONITORING AND ANALYZING DATA

FIELD OF THE INVENTION

The present invention relates to a platform and method for monitoring and analyzing data, and more specifically to a platform which a user can utilize to readily evaluate the quality of web services which have been delivered in order to identify problems and devise convenient solutions for same.

BACKGROUND OF THE INVENTION

The delivery of web services promises to be the next wave of Internet-based applications.

There has been a strong emphasis by software vendors and service providers, as of late, to implement web service-oriented architectures that will provide a means by which companies can expose their offerings as web services.

In today's economy, the Internet is not only being used to provide information and perform simple e-commerce transactions but is also being used as a platform through which services are delivered to businesses and customers.

In this regard, services delivered by way of the Internet have typically been referred to as "e-services," while the term, "web service" refers normally to an e-service delivered using standard web technology such as HTTP, XML, and SOAP. According to several market research firms, it is extremely likely that before the year 2005, many companies' offerings will be available as web services. In fact, the delivery of web services has recently been enhanced by the delivery of recently developed standards and tools that support the creation and delivery of web services.

Heretofore, the primary focus of web service, software vendor and other developers has been supporting providers and getting their specific web services up and running, as well as supporting customers and finding and accessing services. Following the implementation and support of the web services provided by a company, however, attention quickly shifts from creation, and delivery of these web services, to the management of same. As companies diversify in the types and numbers of web services which are being delivered, tools are needed to support and automate the web service management effort.

Heretofore, some research and development has been directed to these types of management concerns. For example, networks and distributed systems are probably the areas in which the most work on measuring and management issues directed to web-based services has been done. This research effort has resulted in the development of standards and commercial management platforms such as HP OpenView or IBM Tivoli. The mark "HP OpenView" and "IBM Tivoli" are the trademarks of the Hewlett-Packard and IBM Companies, respectively. Still further, the International Telecommunications Union (ITU) in the early 1990's proposed recommendations for measuring distributed software applications and for deriving statistics from collected measures. The basic component of the ITU proposed framework was a metric object. The metric object specifies how a certain application should be monitored by defining how it's attributes should be transformed into measures. The system provides a measure threshold above which a management application should be notified.

While the applications noted above have worked with some degree of success, these particular applications are concerned with metrics for distributed objects and which focus on interfaces and protocols for management applications and are normally concerned with performance and monitoring issues only. Further, they provide no specific means by which diverse web services can be managed with a high degree of efficiency.

Recently, several researchers have developed approaches to measure distributed objects running on top of middleware platforms. The majority of these contributions focus on the definition of quality of service (QoS) criteria. These research efforts are relevant to the most common metrics that business users want to analyze. However, these same approaches still fall short of providing a convenient analysis tool for use by those monitoring the delivery of web services. Moreover, the available research, techniques and prior art practices provided heretofore have proven to be less than flexible, and further require substantial modification, in the form of code writing, in order to make them useful in diverse web service applications.

Finally, the contributions provided in the prior art methods and other products provided heretofore in the area of managing the delivery of web services have been focused on the collection of performance measures to support availability and capacity planning, and have not been readily expandable to include other user defined management issues.

A platform and method for monitoring and analyzing data which addresses the perceived shortcomings attendant with the prior art practices utilized heretofore is the subject matter of the present application.

SUMMARY OF THE INVENTION

One aspect of the present invention relates to a platform for monitoring and analyzing data and which includes, at least one measurement logic which converts service execution data having a plurality of elements into a measure, and wherein a subset of the elements of the service execution data is identified as a context; a metric which identifies an aspect of a business that a user wishes to monitor, and analyze, and wherein the metric has a predetermined data type; and a meter which defines the measurement logic used to compute the measures for use with the metric and the subset of the elements within the context.

Another aspect of the present invention relates to a platform for monitoring and analyzing data and which includes a measurement logic employed by a user to define and configure a plurality of mapping templates for use in converting service execution data into a plurality of measures; a meter employed by a user to compute the individual measures; and a metric which utilizes a measure and which has a predetermined data type and which is applied to the service execution data.

Still another aspect of the present invention relates to a method for monitoring and analyzing service execution data relating to web services and which includes defining and configuring a plurality of mapping templates; converting the service execution data relating to the web services into a plurality of measures by employing the mapping template; identifying an aspect of a web service which a user wishes to monitor and analyze by utilizing at least one metric which has a predetermined data type; and computing the measures for use with the at least one metric.

Still another aspect of the present invention relates to a computer readable media bearing computer software that, when loaded into a general purpose computer, causes the computer to implement a method for analyzing data relating to diverse web services including, providing a graphic user interface which may be utilized by a user; defining and configuring a plurality of reusable mapping templates by the use of a measurement logic, and which is implemented by way of the graphic user interface; defining a plurality of meters which are employed by the user to compute individual measures; converting heterogeneous service execution data which relates to the diverse web services into a plurality of measures by utilizing the individual reusable mapping templates; identifying an aspect of the diverse web services which the user wishes to homogeneously analyze and monitor by utilizing a plurality of user defined metrics which are implemented by way of the graphic user interface; computing the individual measures for use with a plurality of user defined metrics; and homogeneously analyzing the heterogeneous service execution data by computing and aggregating the plurality of metrics across a user defined level of abstraction.

Yet a further aspect of the present invention relates to a platform for monitoring and analyzing service execution data which relates to web services and which includes, means for defining and configuring a plurality of reusable mapping templates; means for defining a meter which is utilized to compute a measure; means for converting the service execution data relating to the web services into a plurality of measures by employing the mapping templates; means for defining a metric which has a predetermined data type, and which identifies an aspect of a web service which a user wishes to monitor and analyze; and means for computing the measures for use with a metric.

These and other aspects of the present invention will be discussed in greater detail hereinafter.

DESCRIPTION OF THE DRAWINGS

Preferred embodiments of the invention are described below with reference to the following accompanying drawings.

DETAILED DESCRIPTION OF THE INVENTION

This disclosure of the invention is submitted in furtherance to the constitutional purposes of the U.S. Patent Laws to promote the progress of science and the useful arts.

Figure 1:
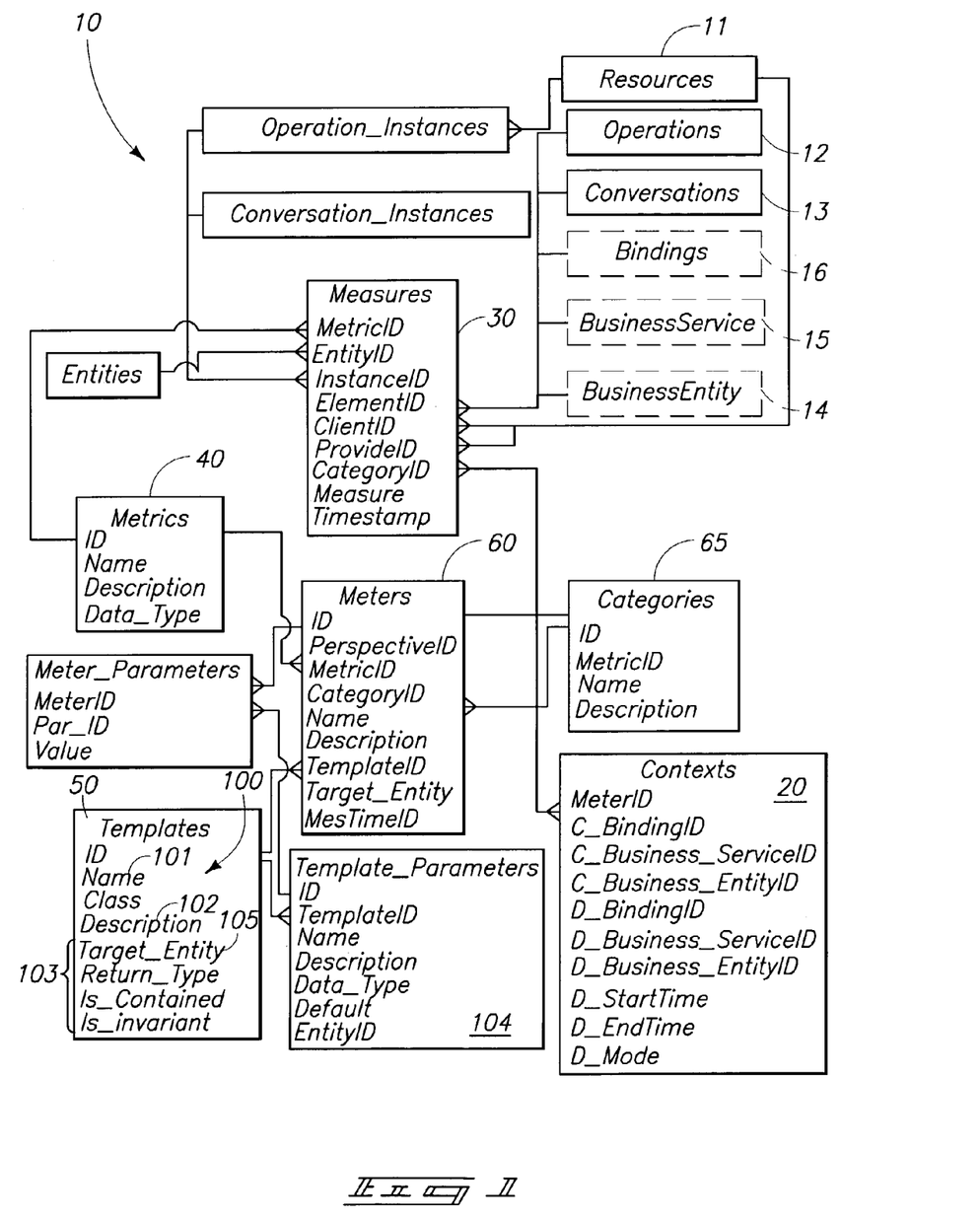
FIG. 1 is a greatly simplified schematic drawing illustrating the data model of the present invention.

Referring now to FIG. 1, the platform and method for monitoring and analyzing web service data derived from diverse web services is generally indicated by the numeral 10. As seen therein, it should be understood that the platform 10 as described hereinafter makes very few and mostly general assumptions regarding the service model it is employed to monitor, that is, the properties of the web services and how they are structured. Therefore, the platform 10 as described hereinafter, and the assumptions utilized with same, are normally compatible with virtually any service model. As seen in FIG. 1, the platform 10 only assumes that resources 11 (acting as clients), invoke operations 12 provided by other resources, and which act as service providers. Resources 11 and operations 12 are characterized in the platform 10 by unique identifiers. As should be understood, operation invocations may include input and/or output parameters. Still further, it should be understood that resources 11 (acting as clients) may conduct conversations 13. These conversations 13 are characterized by sequences of operations and invocations with service providers. The conversations 13 may have conversation definitions which are characterized by various states, such as for example, in negotiation, offer accepted, or offer rejected; or by state transitions, that is, caused by clients' operation invocations, for example, the purchase of a better service. Still further, these state transitions may also include autonomous service provider/initiated transitions. An example might be a time-out which leads to a conversation into a timed-out state.

The operations 12 may be composite, that is, they may be executed by invoking other operations, and which are offered by the same or by different service providers. In the present platform 10, conversation models are fundamentally different from composition models. Conversation models have the purpose of defining the external behavior of a service and/or restricting in particular the order in which operations 12 can be invoked. In the present platform 10, the composition models permit the specification of operation 12 implementations in terms of combination of other operations.

The platform 10 as seen in FIG. 1, provides a convenient means whereby users may define and analyze IT metrics. As should be appreciated however, in many cases users can benefit from an enhanced service model which includes a variety of different entities, each of which has its own properties. For example, if a company has adopted the UDDI (Universal Description Discovery of Integration) and WSDL (Web Services Description Language) standards and has structured its services accordingly, it may need to analyze and consider service execution data provided from same according to the UDDI or WSDL perspectives.

In view of the diverse needs of web service providers to analyze web service execution data relating to various services which may be supplied by the same, or similar entities, the platform 10 as shown in FIG. 1 allows a user to define, and thereafter utilize the model on which they base their services. The user can define characteristics that can be used for defining the service metrics, and the computation logic utilized with same. The metrics, and computation logic will be discussed hereinafter.

As presently conceived, the platform 10 permits a user to monitor and analyze heterogeneous service execution data relating to web services in a homogeneous fashion.

In an effort to illustrate how the platform 10 can be applied to a given service model, FIG. 1 shows the platform 10 which operates in combination with a model taken from UDDI and endowed with WSDL specifications for those aspects of the model not covered by UDDI. While that which is illustrated in FIG. 1 is considered a "default model" which will normally be delivered with the platform 10 for commercial use, it should be understood that other default models can be developed and can be utilized with the platform 10 with equal success. Therefore, what is shown in FIG. 1 is illustrative only of the present invention as utilized with a given service model. As will be recognized, the UDDI, and WSDL are the leading and standard protocols in the web service space. In this regard, UDDI allows the specification of business or service properties, while WSDL is used for describing the service interface.

In UDDI, service providers are represented by business entities 14 consisting of a universally unique identifier (UUID). In this regard, the business entities 14 are identified by a name, and by reference to a taxonomy, and by identification schemes for identifying and classifying entities in different semantic contexts. An example of this identification would be the Duns & Bradstreet identification number.

A business entity can also offer a number of business services 15 which are also characterized by a UUID and a name. Each business service can have one or more bindings 16 corresponding to various implementations of a service and characterized by a web page location, as well as references to taxonomy and identification schemes. These identifications readily identify and classify the bindings' properties in different contexts, which is generally indicated by the numeral 20. It will be recognized that a subset of the elements of the service execution data invention relating to the diverse web services is also identified as a context 20. In the present invention 10, as shown in FIG. 1, binding definitions 16 typically (but not necessarily) include references to the interfaces and conversation 13 which they support.

Although UDDI allows the specification of references to interface description, it does not provide an interface description language. WSDL provides this interface description language. In particular, in WSDL an interface is characterized by a set of operations that can be input/output, that is, client's invoke an operation 13 and the service sends a reply such as input only, output only, etc. As disclosed above, WSDL operations can have XML parameters whose structure is defined by XML schemes. A plurality of WSDL operations can be grouped and implemented together.

In order to implement the present platform 10, a user must specify a set of entities. For example, bindings 16, business entity 14, and business service 15 are examples of entities (represented by dashed boxes) which define the characteristics of the resources 11 providing services. Objects that belong to a business entity 14 are hereinafter defined as elements. For example, if a user of the present platform 10 had defined an entity called business service 15, the category "employee reimbursement" would be viewed as an element of the entity called business service 15. Each element is characterized by a unique identifier, a name, and an arbitrary, that is, user defined set of properties as will be hereinafter discussed.

As seen in FIG. 1, it should be understood that a given service model is specified by XML documents that list the name of the different entities, as well as the definition of "part of" hierarchies. The present platform 10 permits bottom-up or tree shaped hierarchies with entities of the present platform 10 at the root of each tree. This platform design makes the analysis simpler in that it provides a unique way, or path by which measures 30 can be aggregated along the tree from the roots to it's outermost "leaves." The characteristics of the measures 30 will be discussed in further detail hereinafter.

The platform 10 as seen in FIG. 1 allows the user to define a business metric 40 and which is used for measuring and analyzing web service data executions. In the present platform 10, once the metrics 40 have been defined, the platform 10 can then be utilized to compute measures 30 and thereafter support a user in analyzing the results. As should be understood, a wide variety of metrics 40 can be defined by the user and which may be needed for monitoring and measurement as applied to various web services. In this regard, while some metrics 40 are commonly needed, and have a commonly agreed upon semantics, others depend on the type of analysis that is needed; on the nature of the service provided; and on the users or analysts preferences and perspectives. For example, a meter named "Quality" could be characterized as follows in an XML Format:

```
<METRIC>
<NAME> Quality</NAME>
<DESCRIPTION> . . . </DESCRIPTION>
<DATA_TYPE MTYPE="TAXONOMY">
<CATEGORY> Excellent </CATEGORY>
<CATEGORY> Good </CATEGORY>
<CATEGORY> Fair </CATEGORY>
<CATEGORY> Poor </CATEGORY>
</DATA_TYPE>
</METRIC>
```

As will be understood from a study of FIG. 1, the metrics 40 are integrated into a metric framework composed of three basic entities, the first entity being the metric 40 that is to be computed; the second, being the mapping templates 15 that define how service execution data can be mapped into qualitative and quantitative measures; and the third being the meter 60 that defines which mapping template 50 should be used to compute which metric 40. Different mapping templates can be used depending on the element being measured. This aspect of the metric framework, allows for the homogeneous analysis of heterogeneous objects or service execution data as described earlier. In the present platform 10 as seen in FIG. 1, the present platform provides a convenient means by which a user can specify metrics 40, as well as their computation for different objects made up of web service execution data. Still further, these same metrics 40 can be derived by composing other metrics. Yet further, the platform 10 can automatically aggregate metrics 40 along different abstraction levels of a user defined model as will be discussed hereinafter.

A metric 40 as provided for in the present platform 10, and as shown in the example above, includes among others, a name unique within the platform, and a data type that can be numeric; Boolean; a Boolean distribution, taxonomy; or a taxonomy distribution. In the case of taxonomies, the definition also includes a description of the categories that may be a part of the taxonomy. In the platform 10 as seen in FIG. 1, at least one measurement logic is provided and which converts service execution data having a plurality of elements into a measure 30. As earlier discussed, a context 20 identifies a subset of elements of the service execution data 20. As discussed above, a metric 40 is provided and which identifies an aspect of a business that a user wishes to monitor and analyze, and the metric has a predetermined data type. Still further, the platform 10 includes a meter 60 which defines the measurement logic used to compute the measures 30 for use with the metric 40 and the subset of elements within the context 20. For example, a meter named "Fast" could be characterized as follows in an XML format:

```
<METER>
<NAME> Fast
</NAME>
<DESCRIPTION> Defines fast operations </DESCRIPTION>
<CONTEXT>
  <CODOMAIN>
     <SERVICE> sell luxury shoes
     </SERVICE>
  </CODOMAIN>
</CONTEXT>
<TEMPLATE>
  <NAME> Duration Less Than </NAME>
     <PAR>
        <NAME> Limit </NAME>
        <VALUE> 10 <VALUE>
```

Figure 2:
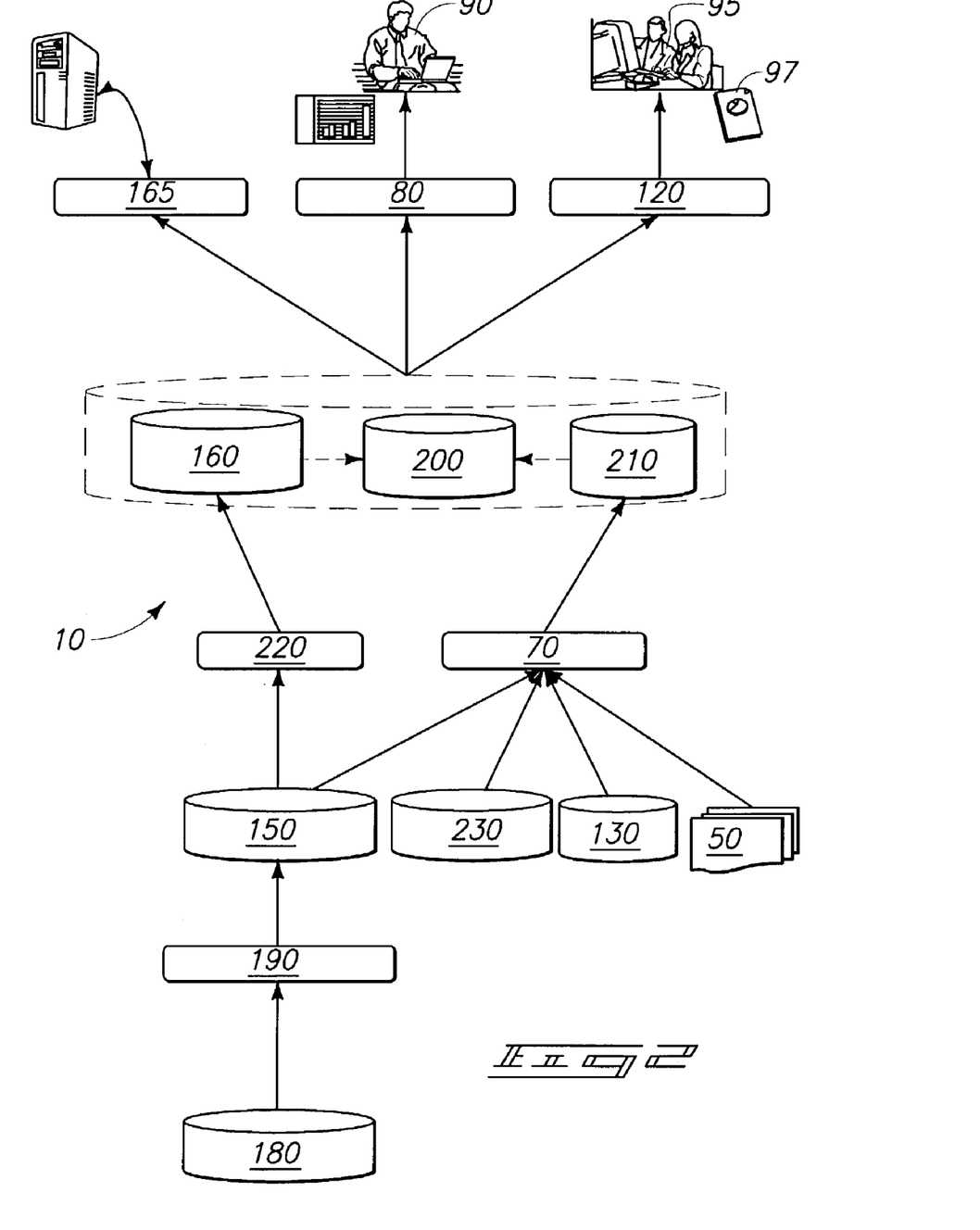
FIG. 2 is a greatly simplified schematic diagram which shows the relationship of the present invention to various user interfaces.

As will be appreciated, the service execution data which is analyzed and measured relates to an internet web-based service which can be of various types. This service execution data may relate to qualitative and/or quantitative business information concerning a plurality of internet web-based services, all of which produce heterogeneous service execution data. The metrics 40 as provided herein, may include a variety of different categories of elements which have been measured, for example, the metric may relate to an elapsed time period associated with the delivery of an internet web-based service. Still further, the metric 40 may identify a taxonomy that comprises a plurality of categories. For example, one of the categories may describe the "quality" of the delivery of a web-based service. An example of the metric Quality is provided, above. As earlier disclosed, the metric 40 is user selectable and definable and may concern goods and services and further, whether for example, an article was purchased. As seen in FIG. 2, the metric 40 is definable and configurable by employing a point and click or Graphic User Interface (GUI) 80. The measurement logic as discussed above is configured to convert the web service information forming the service execution data to be analyzed into either Boolean date, or numeric data.

As noted above, at least one measurement logic is provided and which converts the service execution data having a plurality of elements into a measure 30. The measurement logic which is provided includes at least one mapping template 50 having a first human readable portion, and a second portion having information which can be utilized by a graphic user interface 80. For example, a mapping template named "Duration Less Than" could be characterized in an XML format as follows:

```
<TEMPLATE>
<NAME> Duration Less Than </NAME>
<DESCRIPTION> Determines whether the execution time of an
operation was less than a specified amount.
</DESCRIPTION>
<COMPOSITION_TYPE> DIRECT </COMPOSITION_TYPE>
<TARGET_ENTITY> OPERATION INSTANCE
</TARGET_ENTITY>
<RETURN_TYPE> BOOLEAN </RETURN_TYPE>
<PARAMETERS>
<PAR>
<PAR_NAME>Limit</PAR_NAME>
<PAR_DESC> Limit Duration in seconds </PAR_DESC>
<PAR_TYPE> NUMBER</PAR_TYPE>
</PAR>
    </PARAMETERS>
    <IMPLEMENTATION>
  <IMPL_LANG> SQL</IMPL_LANG>
  <IMPL_CODE>
       SELECT
MTE.METRIC_id,
E.ID,
OI.ID,
OI.OPERATION_DEF_ID,
OI.CLIENT_ID
OI.PROVIDER_ID
MTE.CATEGORY_ID
NULL,
SYSDATE
FROM OPERATION_INST OI, RESOURCES P, CONTEXTS C,
METERS MTE, TEMPLATES T, ENTITIES E, INSTANTIATION_
PARS IP WHERE
T.NAME='IS DURATION_LESSEQ_THAN'
AND MTE.TEMPLATE_ID=T.ID
AND OI.PROVIDER_ID=P.ID
AND C.METER_ID=MTE.ID
AND (
  (P.BINDING_ID=C.C_BINDING_ID OR
  C.C_BINDING_ID IS NULL)
AND
AND E.NAME='OPERATION'
AND IP.METER_ID=MET.ID AND IP.PAR_ID=T.PAR_ID
OPS.OPERATION_DEF_ID=OI.OPERATION_DEF_ID AND);
OI.DURATION<=IP.VALUE
</IMPL_CODE>
</IMPLEMENTATION>
</TEMPLATE>
```

The measurement logic normally includes a plurality of mapping templates 50, each having different template parameters as seen above. As seen in FIG. 2, a graphic user interface 80 is provided and which permits a user 90 to select and implement individual mapping templates 50. The mapping template has a specification 100 which includes a name 101; a description 102; and a plurality of attributes 103 all of which are in human readable form. As discussed above, the metric 40 provides various data types, and the measurement logic as provided for in the platform 10 determines if an individual element as discussed above belongs to a category within a particular taxonomy. The context 20 restricts the computation of the measurement logic to an object related to the aspect of the business that a user wishes to monitor and analyze. A template engine 70 (FIG. 2) is provided and which is employed to process the respective mapping templates 50.

As seen in FIGS. 1 and 2, a platform 10 for monitoring and analyzing data in one respect includes a measurement logic employed by a user to define and configure a plurality of mapping templates 50 for use in converting service execution data relating to diverse web services into a plurality of measures 30. Still further, a meter 60 is employed by a user 90 to compute the individual measures 30; and a metric 40 utilizes the measures 30, and further has a predetermined data type and is applied to the service execution data. As should be understood, the context 20 restricts the computation of the measurement logic to a set of elements of an entity that a user wishes to monitor and analyze. In the arrangement as shown in FIG. 1, the measurement logic is configured in some instances to convert the service execution data into Boolean data, and in other instances is configured to convert the service execution data into numeric data. Still further, the measurement logic may relate to other aspects of the web-based service such as whether an activity under taken by way of the internet web-based service resulted in a sale of a good or service.

The mapping templates 50, include parametric definitions 104 derived from a mapping from service execution data, and metadata into numeric or Boolean measures. In the arrangement as shown in FIG. 1, a meter 60 can reuse individual mapping templates 50 having specific values and other parameters, and apply them to the elements or other aspects of the business that the user 90 wishes to monitor and analyze. These meters 60 define, therefore, how measures 30 for a given metric 40 are computed depending upon the aspects of the business being measured. The mapping templates 50 as seen in FIG. 1 and as shown in the example above, are defined by XML documents. Each of the respective mapping templates 50 includes a specification part 100 and an implementation part. The specification part has three purposes, the first being to provide a human readable description about the purpose of the mapping template and how to use it; second, it provides information that can be utilized by the graphic user interface 80; and third, it provides information that a mapping template engine 70 (as seen in FIG. 2), can use to optimize measurement computations.

The respective mapping templates 50 have an implementation part which contains parametric code 104 executed by the platform 10 to compute the respective metrics 40. The implementation part is specified in SQL although other languages may be used if the service execution data sources are not relational. The specification 100, as noted above, includes a name 101; a description 102; and a set of attributes 103. For example, the target entity 105 is used to specify the kind of elements or other aspects of a web-based service that are measured, that is business entities, business services, operations, etc.

For each of the mapping template parameters 104, the definitions which are provided include the indication of the parameter name, data type, default value and textual description which can be used to convey the semantics of the parameter to a user 90. The respective data types which are employed include any SQL type. In addition, a reference attribute enables mapping template designers to state that the mapping template parameters 104 should be a reference to an element of a given entity.

The implementation part of the respective mapping templates 50 is represented by an SQL query whose results are the individual measures 30. Therefore, according to the arrangement as shown, the user 90, employing the respective mapping templates 50 are permitted to develop a complex mapping semantics by utilizing simple SQL queries.

The meters 60 define which mapping template 50 should be applied to compute a metric 40 within a given context 20. For example, a meter 60 can define which mapping template 50 should be used to compute a metric 40 for a given business operation, while another meter 60 can define a different mapping template 50 for other aspects of the same type of web service. It is the capability of using different meters 60 for different contexts that allows a user 90 to homogeneously analyze heterogeneous service execution data relating to diverse goods or services that is, by utilizing the same metric. Quite simply, this particular invention 10 allows an analyst to see all aspects of a plurality of web services (while being quite diverse), under the same lens or perspective. To implement or initiate operation of given mapping templates 50, each of the meters 60 must specify which mapping template 50 it instantiates and which are the values to be given to the respective instantiation parameters provided by same. In a meter 60, contexts 20 are characterized by a domain and a co-domain. The co-domain defines the set of elements or aspects of the web service business which are being analyzed and for which the measures are computed. The domain on the other hand, defines the set of elements used as the base for the computation and includes a space and time component. The space component restricts the set of elements being considered based on their name and the entities to which they belong. In the platform 10 as shown, the arrangement of the contexts 20, and the mapping templates 50 are provided in a fashion such that users 90 have a relatively simple way to define and manage contexts 20 while allowing the re-use of various mapping templates 50 to meet the needs of the analyst 95 utilizing same.

In addition to the foregoing, the definition of a respective meter 60 may optionally include the specification of when the measure 30 should be computed. This can be done by setting a measurement time attribute (not shown).

Referring now to FIG. 2, the platform 10 includes a metric database 130 which is structured in accordance with data warehousing techniques. Measures 30 along with operations 12; conversations 13; and service execution data are represented as facts. These facts can be analyzed according to several data warehouse dimensions. The platform 10 includes two types of measured facts, those are specific and custom. Specific measures 30 provide information about elements of a business entity 14 or other web-based service in the service model. Custom measures, on the other hand, are not necessarily related to a single specific element or entity, and may have other attributes further qualifying the measure 30 to enable the computation of a specific custom measure. The platform 10 enables users 90 to define custom tables that include any additional attributes that they may consider relevant for the respective measures 30.

The platform 10 as shown in FIG. 2 also includes a shadow web service data warehouse 150 and a web service data warehouse generally indicated by the number 160. Data in the web service warehouse can be accessed with virtually any available reporting tool 120. In fact, it is possible to define configuration files for such tools so that a user can view any files without writing any query.

While it will be seen that multi-dimensional analysis of various measures 30 is indeed powerful, it is of limited usefulness in helping an analyst 95 understand why a specific metric 40 has certain values. For example, an analyst 95 would like to know what causes the outcome of an operation or web-based service to be a failure, or on the other hand, why the particular web-based service quality is poor, or the performance is slow. Obviously, understanding what causes a measure to have a given value is a basic step towards making changes to improve that measure. In an effort to help analysts in uncovering cause and effect relationships, the platform 10 supports a metric 40 correlation analysis. The metric correlation analysis examines how measures 30 of a given metric 40 change depending on the measure 30 of another metric 40. Still further, the platform 10 provides a means whereby problems can be further analyzed by accessing the meter 60 used for a particular computation to understand what exactly is the nature of a low quality other aspect of a web based service being analyzed.

Since the number of possible reports 97 generated by the platform 10 with respect to various correlations could be quite high, the amount of data shown to a user 95 can be overwhelming. Thus, it might be difficult to discover any interesting correlations. To further assist an analysts' 95 review, the platform 10 permits users to focus on specific aspects of a web-based business by permitting the definition of a filtering threshold so that only elements for which correlated data differ from the uncorrelated ones by more than a threshold are shown. For example, a user 95 may define that they only wish to see correlations among data derived from binding 16, for example, and which has a deviation from the uncorrelated distribution of more than 10 percentage points in at least one category 65.

As will be evident, from the discussion above, the platform 10 has three main functionalities, a first one, which allows users to define and manage metrics 40; meters 60; and mapping templates 50; a second aspect which includes loading data from operational sources; and a third aspect relating to computing individual metrics. It also provides programmatic, and graphical access to the measures 30. As should be understood, a user 90 can access these functionalities through a graphic user interface 80. As noted above, the platform 10 has a SOAP API 165 which is specified through a WSDL document. In addition to inbound interaction, the platform 10 can initiate access to mapping template libraries exposed as web services.

Following metric 40 definition, implementation of a given metric is rather straightforward and is made by point and click interfaces 80 to let users enter metric definitional data that will be stored in the platform metric database 130. As seen in FIG. 2, the platform 10 collects service definition and service execution data into its data warehouse 160. This specific service definition and service execution data 180 is loaded by an extract transfer and load (ETL) application 190 whose specifics depend on the kind of data logged by web services platforms, and on the service model defined during the platform 10 deployment. The ETL loads data on a periodic basis or at a user's request. The service definition and service execution data 180 is received into a temporary shadow web service warehouse 150. This shadow web service warehouse 150 is a mirror or a subset of the structure of the actual web service warehouse 160 used for the analysis. The purpose of the shadow web service warehouse 150 is to provide a temporary storage area on which to compute the respective measures 30. The computation is faster on the shadow web service warehouse 150 because it only contains data logged since the last load cycle. In this arrangement, the platform 10 assumes that all data about an operation 12 or conversation 13 are loaded in the same load cycle and are therefore together and available in the same shadow web service warehouse 150. In the arrangement as shown in FIG. 2, the platform then computes contained and invariant measures 200 and 210 respectively on the service definition and execution data. As seen in this arrangement, measures 30 are computed by executing all the templates 50 instantiated by at least one meter 60. As seen in FIG. 2, the platform includes a loader 220 which moves data from the shadow web service data warehouse 150 to the web service warehouse 160.

Still further, other user data or metadata 230 can be provided for use in the template engine 70.

The operation of the described embodiment of the present invention is believed to be readily apparent and is briefly summarized at this point. As seen by a study of FIGS. 1 and 2, a method for monitoring and analyzing service execution data 180 relating to web services includes, defining and configuring a plurality of mapping templates 50; converting the service execution data 180 relating to the web services into a plurality of measures 30 by employing the mapping templates 50; identifying an aspect of a web service which a user wishes to monitor and analyze by utilizing at least one metric 40, and which has a predetermined data type; and computing the measures 30 for use with the at least one metric. As discussed in the paragraphs above, the method as provided by the present platform 10 permits a user to compute and aggregate a plurality of metrics 40 across different user defined levels of abstraction. In the present arrangement, the at least one metric 40 is user defined and the service execution data contains heterogeneous data, and the method further includes the ability to homogeneously analyze the heterogeneous service execution data 180 by utilizing the user defined metric 40. In the arrangement as shown, the service execution data may further include user supplied metadata 230. Yet further and as discussed earlier, a measurement logic is employed to compute the metric 40 and wherein the user defined metric is independently operable from the measurement logic. The present platform 10 also provides a convenient means whereby the platform 10 operates in combination with a user defined service model and is further operable to work with various commercial reporting tools 120 to provide user defined reports 97 regarding the metrics 40. In the platform 10 as described, the mapping templates 50 are reusable and a user 90 employing the mapping templates normally does not have to write code. Still further, the user employing the mapping templates 50 of the present invention are permitted to develop complex mapping semantics by utilizing simple SQL queries.

Therefore the present invention provides a computer, readable media bearing computer software that when loaded into a general purpose computer, causes the computer to implement a method for analyzing data relating to diverse web services and which includes, providing a graphic user interface 80 which may be utilized by a user 90; defining and configuring a plurality of reusable mapping templates 50 by the use of a measurement logic and which is implemented by way of the graphic user interface 80; defining a plurality of meters 60 which are employed by the user to compute individual measures 30; converting heterogeneous service execution data 180 which relates to diverse web services into a plurality of measures 30 by using the individual reusable mapping templates 50; identifying an aspect of the diverse web services which the user 95 wishes to homogeneously analyze and monitor by utilizing a plurality of user defined metrics 40 which are implemented by way of the graphic user interface; computing the individual measures for use with the plurality of user defined metrics 40; and homogeneously analyzing the heterogeneous service execution data 180 by computing and aggregating the plurality of metrics 40 across a user defined level of abstraction.

Finally, the platform 10 for monitoring and analyzing service execution data which relates to web services includes means for defining and configuring a plurality of mapping templates 50; means for defining a meter 60 which is utilized to compute a measure 30; means for converting the service execution data 180 relating to the web services into a plurality of measures 30 by employing the mapping templates 50; means for defining a metric 40 which has a predetermined data type and which identifies an aspect of a web service which a user 90 wishes to monitor and analyze; and means for computing the measures 30 for use with a metric 40.

Therefore, it will be seen the platform 10 for monitoring and analyzing data of the present invention provides a convenient means whereby diverse web services can be analyzed quickly, conveniently, and most importantly across various user defined levels of abstraction. The present platform and method of implementing same provides a convenient tool whereby aspects of diverse web services can be analyzed under various perspectives and as applied to heterogeneous data in a fashion not possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A platform for monitoring and analyzing web service data, comprising:

a measurement logic employed by a user to define and configure a plurality of selectable, reusable mapping templates, different mapping templates having different parametric definitions, the mapping templates respectively used in converting service execution data into at least one of numeric and Boolean measures used with a metric;

a meter specifying a mapping template used to compute measures for a metric; and a metric that identifies an aspect of the web service data that a user wishes to monitor and analyze, the metric having a name and a data type and the metric, in operation, utilizing the measures, wherein the metric is communicated to the user to enable the user to analyze the web service data.

2. A platform as claimed in claim 1 wherein the data type of the user-selected metric is selected from the group consisting of Boolean, Boolean distribution, taxonomy, and taxonomy distribution.

3. A platform for analyzing heterogeneous data relating to diverse UDDI web services, comprising:

a user defined metric that permits homogeneous analysis of the heterogeneous data, the heterogeneous data including web service execution data, the user defined metric relating to at least one of qualitative and quantitative metrics;

a measurement logic to compute the metric, the measurement logic including a plurality of selectable, reusable mapping templates, different mapping template having different parameters, the mapping templates respectively used in converting web service execution data into at least one of numeric and Boolean measures used with the metric; and a data warehouse that receives the service execution data, wherein the metric is communicate to the user.

4. A platform as claimed in claim 3, and wherein the service execution data further includes user supplied metadata.

5. A platform as claimed in claim 3, and wherein the same user defined metric is selectively applied to the heterogeneous data.

6. A platform as claimed in claim 3, and wherein the platform operates in combination with a user defined service model.

7. A platform as claimed in claim 3, and wherein the platform includes a plurality of user defined metrics, and wherein the platform computes and aggregates the plurality of metrics across different, user defined levels of abstraction.

8. A platform as claimed in claim 3, and wherein a reporting tool is operable to work in combination with the platform to provide user defined reports regarding the metrics.

9. A platform as claimed in claim 3, and wherein the user employing the mapping templates does not have to write code.

10. A platform as claimed in claim 3, and wherein a complex mapping semantic is selectively developed, using the mapping template, by utilizing simple SQL queries.

11. A platform as claimed in claim 3, and that includes a plurality of functionalities selectively accessed by a user by way of a graphic user interface.

12. A platform for monitoring and analyzing Internet web-based service data, comprising:

a function that, in operation, computes values from Internet web-based service data;

a metric identifying an aspect of Internet web-based services that a user desires to monitor and analyze, the metric having a data type and a value that is computed by the function and applied to the data;

measurement logic employed by the user to define and configure a plurality of selectable, reusable mapping templates, different mapping templates having different parametric definitions, the mapping templates converting the Internet web-based service data into at least one of numeric and Boolean measures used with the metric, wherein at least one mapping template having a first, human readable, portion, and having a second portion including information selectively utilized by a Graphic User Interface; and providing the user with an analysis of the metric relating to a quality of the Internet web-based services.

13. A platform as claimed in claim 1, and wherein the data type is numeric; Boolean; Boolean distribution; Taxonomy; or Taxonomy distribution.

14. A platform as claimed in claim 1, and wherein the data relates to qualitative and/or quantitative business information concerning a plurality of Internet web-based services.

15. A platform as claimed in claim 1, and wherein the metric relates to an elapsed time period associated with delivery of an Internet web-based service.

16. A platform as claimed in claim 1, and wherein the metric comprises a plurality of categories associated with delivery of an Internet web-based service.

17. A platform as claimed in claim 1, and wherein the metric is user selectable.

18. A platform as claimed in claim 1, and wherein the metric relates to whether an article was purchased.

19. A platform as claimed in claim 1, and wherein the metric is definable and configurable employing a point and click interface.

20. A platform as claimed in claim 1, wherein, in operation, the measure is utilized by the metric to convert the data into Boolean data.

21. A platform as claimed in claim 1, wherein, in operation, the measure is utilized by the metric to convert the data into numeric data.

22. A platform as claimed in claim 1, wherein, in operation, the measurement logic relates to whether an activity undertaken by way of an Internet web-based service resulted in a sale of a good or service.

23. A platform as claimed in claim 1, and wherein the data relates to heterogeneous goods or services, and wherein the platform facilitates homogeneous analysis of the heterogeneous goods or services.

24. A platform as claimed in claim 1, wherein the plurality of mapping templates each having different template parameters, and wherein the Graphic User Interface permits a user to select and implement individual templates.

25. A platform as claimed in claim 1, wherein one of the mapping templates has a specification that includes a name; a description; and a plurality of attributes, all of which are in human readable form.

26. A platform as claimed in claim 1, and wherein the data includes service execution data stored in a data warehouse, and wherein a reporting tool selectively accesses the data warehouse.

27. A platform as claimed in claim 1, and wherein the data type is a taxonomy, and wherein the measurement logic is configured to determine if an individual element belongs to a category within the taxonomy.

28. A platform as claimed in claim 1, and wherein the data includes a plurality of elements, a subset of which is identified as a context, and wherein the context restricts computation of a measurement logic that relates to an object associated with an aspect of a business that the user wishes to monitor and analyze.

29. A platform for monitoring and analyzing service execution data that relates to web services, comprising:
   means for receiving a user-selected metric that identifies an aspect of the web services the user desires to monitor and analyze;
   means for defining and configuring a plurality of reusable mapping templates, different mapping template having different parameters, the mapping templates used in converting the service execution data into at least one of numeric and Boolean measures used with the user-selected metric;
   means for converting the service execution data relating to the web services into a plurality of measures by employing the mapping templates;
   means for defining the user-selected metric to have a predetermined data type and to identify the aspect of a web services that the user wishes to monitor and analyze;
   means for computing the measures for use with the user-selected metric; and means for displaying the measures to the user.

30. A method for monitoring and analyzing service execution data relating to web services, comprising:
   receiving a user-selected metric that identifies an aspect of the web services the user desires to monitor and analyze;
   defining and configuring a plurality of selectable, reusable mapping templates, different mapping template having different parameters, the mapping templates used in converting the service execution data into at least one of numeric and Boolean measures used with the metric;
   converting the service execution data relating to the web services into a plurality of measure by employing the mapping templates;
   identifying the aspect of the web services that the user wishes to monitor and analyze by utilizing the user-selected metric that has a predetermined data type;
   computing the measures to be used with the user-selected metric; and
   communicating the measures to the user to enable the user to analyze the aspect of the web services.

31. A method as claimed in claim 30, and further comprising:
   computing and aggregating a plurality of metrics across different user defined levels of abstraction.

32. A method as claimed in claim 30, and wherein the service execution data contains heterogeneous data, and wherein the method further comprises:
   homogeneously analyzing the heterogeneous service execution data by utilizing the user-selected metric.

33. A computer readable media bearing computer software that, when loaded into a general purpose computer, causes the computer to implement a method for analyzing data relating to diverse web services selectively accessed by software applications using SOAP web protocol, comprising:
   providing a graphic user interface selectively utilized by a user;
   defining and configuring a plurality of reusable mapping templates by the use of a measurement logic, the mapping templates being implemented by way of the graphic user interface;
   defining a plurality of meters that are employed by the user to compute individual measures;
   converting heterogeneous service execution data that relates to the diverse web services into the measures by utilizing the individual reusable mapping templates;
   identifying an aspect of the diverse web service that the user wishes to homogeneously analyze and monitor utilizing a plurality or user defined metrics that are implemented by way of the graphic user interface;
   computing the individual measures for use with plurality of user defined metrics;
   homogeneously analyzing the heterogeneous service execution data by computing and aggregating the plurality of metrics across a user defined level of abstraction; and
   providing a user with an analysis of the heterogeneous service execution data.

* * * * *

UNITED STATES PATENT AND TRADEMARK OFFICE
CERTIFICATE OF CORRECTION

PATENT NO. : 7,222,121 B2
APPLICATION NO. : 10/302182
DATED : May 22, 2007
INVENTOR(S) : Fabio Casati et al.

It is certified that error appears in the above-identified patent and that said Letters Patent is hereby corrected as shown below:

In column 14, line 15, in Claim 13, delete "claim 1" and insert -- claim 12 --, therefor.

In column 14, line 18, in Claim 14, delete "claim 1" and insert -- claim 12 --, therefor.

In column 14, line 21, in Claim 15, delete "claim 1" and insert -- claim 12 --, therefor.

In column 14, line 24, in Claim 16, delete "claim 1" and insert -- claim 12 --, therefor.

In column 14, line 27, in Claim 17, delete "claim 1" and insert -- claim 12 --, therefor.

In column 14, line 29, in Claim 18, delete "claim 1" and insert -- claim 12 --, therefor.

In column 14, line 31, in Claim 19, delete "claim 1" and insert -- claim 12 --, therefor.

In column 14, line 34, in Claim 20, delete "claim 1" and insert -- claim 12 --, therefor.

In column 14, line 37, in Claim 21, delete "claim 1" and insert -- claim 12 --, therefor.

In column 14, line 41, in Claim 22, delete "claim 1" and insert -- claim 12 --, therefor.

In column 14, line 45, in Claim 23, delete "claim 1" and insert -- claim 12 --, therefor.

In column 14, line 49, in Claim 24, delete "claim 1" and insert -- claim 12 --, therefor.

In column 14, line 53, in Claim 25, delete "claim 1" and insert -- claim 12 --, therefor.

In column 14, line 57, in Claim 26, delete "claim 1" and insert -- claim 12 --, therefor.

In column 14, line 61, in Claim 27, delete "claim 1" and insert -- claim 12 --, therefor.

In column 14, line 65, in Claim 28, delete "claim 1" and insert -- claim 12 --, therefor.

In column 15, line 36, in Claim 30, delete "measure" and insert -- measures --, therefor.

In column 16, line 29, in Claim 33, delete "service" and insert -- services --, therefor.

UNITED STATES PATENT AND TRADEMARK OFFICE
CERTIFICATE OF CORRECTION

PATENT NO. : 7,222,121 B2
APPLICATION NO. : 10/302182
DATED : May 22, 2007
INVENTOR(S) : Fabio Casati et al.

It is certified that error appears in the above-identified patent and that said Letters Patent is hereby corrected as shown below:

In column 16, line 30, in Claim 33, after "monitor" insert -- by --.

In column 16, line 31, in Claim 33, delete "or" and insert -- of --, therefor.

Signed and Sealed this

Fifth Day of May, 2009

JOHN DOLL
*Acting Director of the United States Patent and Trademark Office*